United States Patent [19]

Aoki et al.

[11] Patent Number: 5,128,956
[45] Date of Patent: Jul. 7, 1992

[54] SEMICONDUCTOR LASER MODULE WITH BUILT-IN OPTICAL ISOLATOR

[75] Inventors: Satoshi Aoki, Chigasaki; Atsushi Murata; Tsuyoshi Tanaka, both of Yokohama, all of Japan

[73] Assignee: Hitachi, Ltd., Tokyo, Japan

[21] Appl. No.: 683,615

[22] Filed: Apr. 11, 1991

[30] Foreign Application Priority Data

Apr. 20, 1990 [JP] Japan .................................. 2-102998

[51] Int. Cl.$^5$ ............................................. H01S 3/08
[52] U.S. Cl. ..................................... 372/703; 372/43; 372/101; 372/106; 372/108; 372/98
[58] Field of Search .................... 372/703, 106, 92, 98, 372/108, 43, 101

[56] References Cited

U.S. PATENT DOCUMENTS 4,686,678  8/1987  Ohta et al. ............................ 372/703
5,044,713  9/1991  Mozer et al. ......................... 372/703

FOREIGN PATENT DOCUMENTS 0343489   5/1989  European Pat. Off. .
0369384  11/1989  European Pat. Off. .
WO8908278  9/1989  PCT Int'l Appl. .
2184289  10/1986  United Kingdom .

Primary Examiner—Léon Scott, Jr.
Attorney, Agent, or Firm—Antonelli, Terry, Stout & Kraus

[57] ABSTRACT

In a semiconductor laser module with a built-in optical isolator which isolator consists of a polarizer, a Faraday rotator and an analyzer, an optical refraction sheet having a wedge-shaped section is disposed on the beam incidence side of the polarizer. Accordingly, even when the mechanical center axis of the optical isolator is placed to be in parallel with the optical axis of the semiconductor laser or in other words, even when the beam incidence-outgoing surfaces of the polarizer, Faraday rotator and analyzer are placed to be vertical to the incident parallel beams, the parallel beams incident into the optical isolator are refracted by the optical refraction sheet having the wedge-shaped section, so that the parallel beams passing through the beam incidience-outgoing surfaces of the polarizer, Faraday rotator and analyzer do not pass vertically and the return of reflected beams to the semiconductor laser can be thus reduced.

22 Claims, 2 Drawing Sheets

SEMICONDUCTOR LASER MODULE WITH BUILT-IN OPTICAL ISOLATOR

BACKGROUND OF THE INVENTION

1. Field of the Invention

This invention relates to a semiconductor laser module with a built-in optical isolator which will be suitable as a transmission light source for optical communication.

2. Description of the Prior Art

Conventional semiconductor laser modules with a built-in optical isolator can be classified into the following two technical groups. In the first technical group, the beam incidence surface of a Faraday rotator consists of a convex surface in order to prevent reflection from the Faraday rotator as described, for example, in JP-A-63-182617. The second technical group employs the structure wherein a lens for condensing the beams passing through an optical isolator and coupling them optically to an optical fiber is fixed after its position is adjusted to the optical isolator passing beams and the optical fiber is then fixed to the lens after its position is adjusted. The technique of this kind is described in JP-A-63-252497.

However, the first conventional technique described above does not take into consideration the fact that when an LPE (Liquid Phase Epitaxy) thick film grown by liquid phase epitaxy is used for the Faraday rotator and the size of this Faraday rotator is reduced in the direction of thickness, machining of the convex surface necessary for preventing reflection becomes impossible. Therefore, it involves the problem that reflection from the optical isolator itself cannot be reduced.

In accordance with the second conventional technique described above, the coupling lens must be first adjusted and fixed to the optical isolator and the optical fiber must then be adjusted and fixed to the coupling lens. In other words, this technique does not much consider the reduction of man-hours for assembly and the reduction of the number of positions requiring adjustment and fixing and involves the problems such as the increase in a machining cost and the increase in fluctuation factors of coupling efficiency due to position errors of adjustment-fixing portions.

SUMMARY OF THE INVENTION

It is therefore an object of the present invention to provide a semiconductor laser module which solves the problems of the prior art described above and which can prevent the return of reflected beams from each beam incidence-outgoing surface to a semiconductor laser even in an optical isolator of the type wherein the beam incidence-outgoing surfaces of a polarizer, a Faraday rotator and an analyzer are in parallel.

It is another object of the present invention to provide an improved semiconductor laser module with a built-in optical isolator which eliminates the necessity for adjustment and fixing of a coupling lens to an optical isolator.

In a semiconductor laser module with a built-in optical isolator which isolator consists of a polarizer, a Faraday rotator and an analyzer, the objects described above can be accomplished by a semiconductor laser module with a built-in optical isolator having a construction wherein a shielding member for refracting at a predetermined angle the parallel beams from a semiconductor laser which are incident into the optical isolator is disposed at a pre-stage of the optical isolator so that the parallel beams passing through the beam incidence-outgoing surfaces of the polarizer, Faraday rotator and analyzer do not pass vertically and the return of reflected beams to the semiconductor laser can thus be prevented.

In order to eliminate the positioning and fixing operations involving the adjustment of the coupling lens that have been necessary in the prior art technique, the present invention disposes in advance the coupling lens on the optical axis of the optical isolator on the beam outgoing side of the analyzer of the optical isolator.

In accordance with the present invention, the returning beams of the reflected beams occurring on the beam incidence-outgoing surfaces of the polarizer, Faraday rotator and analyzer of the optical isolator to the semiconductor laser can be prevented by refracting the incident beams at a predetermined angle without inclining the mechanical center axis of the optical isolator itself with respect to the optical axis of the semiconductor laser, and a semiconductor laser module with a built-in optical isolator capable of preventing near-end reflection from the optical isolator can be accomplished without deteriorating the assembly.

The optical isolator itself can be assembled in a hermetic seal structure without using an organic material such as an adhesive, so that resistance to environment and reliability can be improved drastically. Since no organic material is used for assembly, adverse influences on the semiconductor laser that would otherwise be exerted do not exist. Therefore, the optical isolator can be incorporated into the same hermetic package as the semiconductor laser and the size of the module can be reduced easily.

DESCRIPTION OF THE PREFERRED EMBODIMENTS

Hereinafter, preferred embodiments of the present invention will be described with reference to the accompanying drawings.

First Embodiment

A first embodiment will be described with reference to FIGS. 1 and 2.

Figure 1:
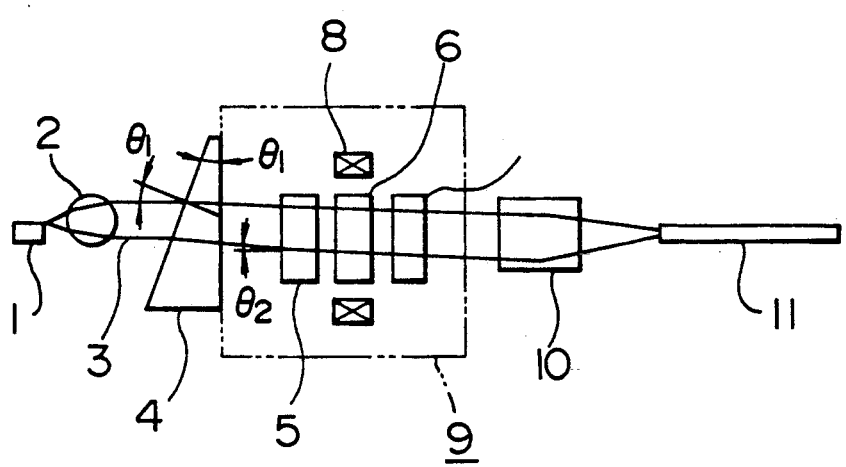
FIG. 1 is a structural view showing an optical system of a semiconductor laser module with a built-in optical isolator in accordance with the present invention.

FIG. 1 shows an optical system of a semiconductor laser module with a built-in optical isolator in accordance with the present invention.

Beams outgoing from a semiconductor laser 1 are converted to parallel beams 3 by a first lens 2. The parallel beams 3 pass through a shielding member 4 whose vertical plane has a taper surface 41 inclined at an angle $\theta_1$ to the parallel beams 3 and which has a refractive index n, such as a glass sheet or a single crystal sapphire 4 and then through an optical isolator 9 (the region encompassed by one-dot-chain line in the drawing) consisting of a polarizer 5, a Faraday rotator 6, an analyzer 7 and a permanent magnet 8 and is then condensed by a second lens 10 for condensing. Here, the parallel beams 3 converted by the first lens 2 are incident into the shielding member 4 with an incident angle of $\theta_1$. Therefore, the parallel beams 3 outgo from the shielding member 4 at an angle $\theta_2$ given below due to refraction:

$$\theta_2 = \sin^{-1}\left[n\sin\left(\theta_1 - \sin^{-1}\left(\frac{\sin\theta_1}{n}\right)\right)\right]$$

The parallel beams 3 are incident into the polarizer 5, the Faraday rotator 6 and the analyzer 7 at the angle $\theta_2$. In this manner the return of the reflected beams that occur on the beam incidence and outgoing surfaces of the polarizer 5, Faraday rotator 6 and analyzer 7 can be prevented.

In other words, the surface of the shielding member 4, which is disposed on the beam incidence and outgoing sides of the polarizer, opposed to the beam incidence and outgoing surfaces of the polarizer 5, is disposed in parallel with the beam incidence surface of the polarizer 5 while the other surface is disposed with the incident angle $\theta_1$ that is determined by the taper shape. The semiconductor laser outgoing beams that are incident in parallel with the mechanical center axis of the optical isolator 9 or in other words, the beams that are incident vertically to the beam incidence and outgoing surfaces of the polarizer 5, Faraday rotator 6 and analyzer 7 and converted to parallel beams by the first lens 2, are refracted by the shielding member 4 and pass at an angle which is not perpendicular to the beam incidence and outgoing surfaces of the polarizer 5, Faraday rotator 6 and analyzer 7 but is determined by the incident angle $\theta_1$ of the taper shape and by the refractive index of the shielding member. In this manner the return of the reflected beams occurring on the beam incidence and outgoing surfaces of the polarizer 5, Faraday rotator 6 and analyzer 7 to the semiconductor laser 1 can be reduced drastically.

Incidentally, the incident angle $\theta_1$ of the shielding member 4 having the taper surface 41 provides fundamentally same effects even if the value is very small but from the practical aspect, the incident angle is from 1° to 10° and preferably from 4° to 5°.

Figure 2:
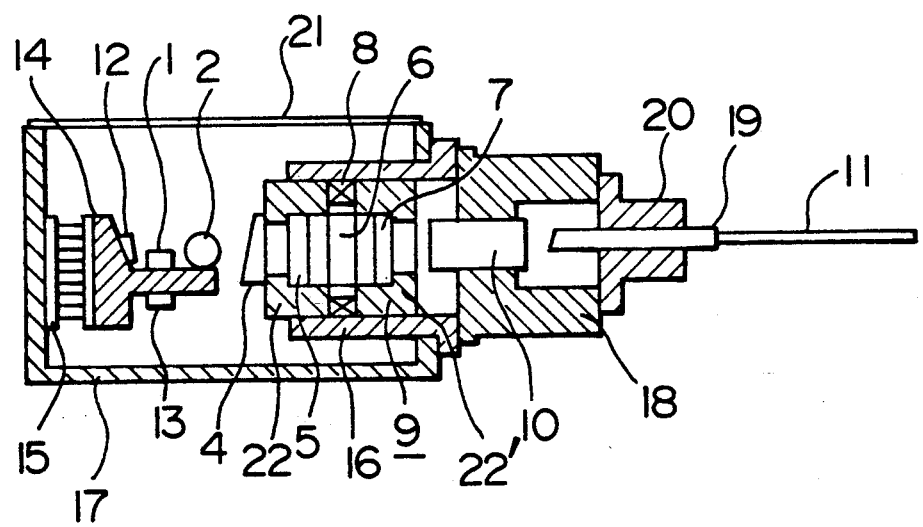
FIG. 2 is a longitudinal sectional view of the semiconductor laser module with a built-in optical isolator in accordance with an embodiment of the present invention.

FIG. 2 is a longitudinal sectional view showing the overall structure of the semiconductor laser module with a built-in optical isolator that uses the optical system shown in FIG. 1.

The semiconductor laser 1 is mounted to a stem 14 with the first lens 2 consisting of a spherical lens, a photo-diode 12 for monitoring and a temperature detection thermistor 13 and the stem 14 is mounted in turn to a thermoelectron cooling device 15 for temperature control. The optical isolator 9 is formed by holding the polarizer 5 made of polarizing glass, the analyzer 7, the Faraday rotator 6 consisting of a LPE thick film formed by liquid phase epitaxy and the ring-like Sm-Co system permanent magnet 8 disposed around the Faraday rotator 6 by holding members 22 and 22', and the shielding member 4 having the taper surface 41 having an angle of inclination $\theta_1 = 4°$ is fixed to this optical isolator 9 on the beam incidence side of the polarizer 5.

The optical isolator 9 described above is fixed to a first holding member 16 which is disposed on the wall of a dual-in-line type hermetical package and the thermoelectron cooling device 15 having the stem 14 mounted thereto is fixed at a position at which the parallel beams 3 pass through the optical isolator 9. The second lens 10 consisting of a condensing type rod lens is hermetically sealed and fixed to a second holding member 18. The second holding member 18 is slid with respect to the first holding member 16 that is fixed to the hermetic package 17 by silver soldering, the position of the second lens 10 is adjusted to the parallel beams passing through the optical isolator 9 and the second holding member 18 is welded and fixed to the first holding member 16 by laser beam welding, for example. The optical fiber 11 is hermetically sealed and fixed to a ferrule 19. A third holding member 20 is slid with respect to the second holding member 18 for positioning and the ferrule 19 is positioned in the direction of the optical axis with respect to the second holding member 18. Each member is fixed by soldering under an optimum state for assembly. Incidentally, a dry inert gas such as a nitrogen gas is packed fully into the spaces inside the optical isolator 9 and hermetic package 17.

Here, if the second lens is disposed in advance on the optical axis of the optical isolator, position adjustment and fixing of the second lens with respect to the parallel beams passing through the optical isolator become unnecessary. Accordingly, man-hours of assembly and fixing portions involved in position adjustment can be reduced and the optical coupling system can be stabilized.

Figure 3:
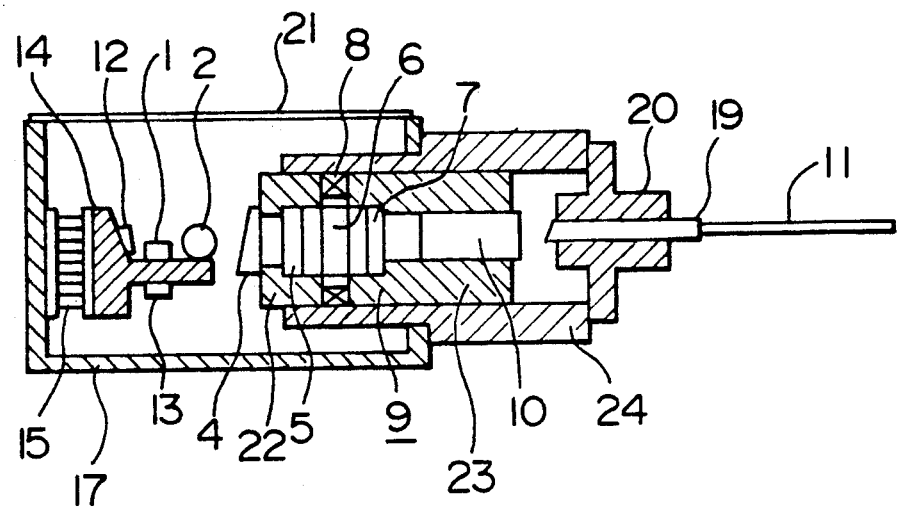
FIGS. 3 and 4 are a longitudinal sectional view showing the semiconductor laser module with a built-in optical isolator in accordance with another embodiment of the present invention and a perspective view showing its optical system, respectively.

FIG. 3 shows another embodiment of the present invention.

Metallization is applied to the surface of the holding member 22, made of covar or ceramic, which comes into contact with the shielding member 4 having the taper surface 41 and with the ring-like permanent magnet 8 and the polarizer 5 made of polarizing glass is sealed and fixed hermetically to the holding member 22 by low melting glass made of PbO, $B_2O_3$. The Faraday rotator 6 is fixed to the ring-like Sm-Co system permanent magnet 8 using likewise low melting glass made of PbO, $B_2O_3$, etc. Metallization is applied to the surface of the holding member 23 made of covar or ceramic which comes into contact with the ring-like permanent magnet 8 and with the condensing type rod lens 10 as the second lens whose outer peripheral surface is metallized, and the polarizer 7 made of PbO, $B_2O_3$ is fixed by low melting glass. After the holding member 22, permanent magnet 8 and holding member 23 described above are adjusted in such a manner as to possess the function of the optical isolator, the optical glass sheet 44 which is metallized on the surface coming into contact with the holding member 22 and has a wedge-shaped section and the condensing type rod lens 10 are mounted to the predetermined positions. Then, the shielding member 4 having the taper surface 41 and the holding member 22, the holding member 22 and the permanent magnet 8 and the holding member 23, and the holding member 23 and the condensing rod lens 10 are fixed to one another by a solder having a lower melting point than the melting point of low melting point glass described above or in other words, by an Au-Sn solder in this embodiment.

The optical isolator 9 assembled by the method described above is fitted to the first holding member 24 which is silver-soldered to the dual-in-line type hermetic package 17 and is fixed by a solder having a lower melting point than that of the solder used for the assembly of the optical isolator or in other words, by use of a Pb-Sn eutectic solder in this embodiment. The thermoelectron cooling device 15 having mounted thereto the system 14 to which the semiconductor laser 1, the first lens 2 consisting of the spherical lens, the photodiode 12 for monitoring and the thermistor 13 for temperature detection are mounted, is fixed by soldering onto the inner wall of the hermetic package 17 at such a position where the semiconductor laser beams converted to the parallel beams pass through the optical isolator 9 and are condensed substantially on the optical axis by the second lens 10. The ferrule 10 to which the optical fiber 11 is sealed and fixed hermetically is slid in the direction of the optical axis with respect to the holding member 20 and the third holding member 20 is slid with respect to the first holding member 24 so that they can be positioned perpendicularly to the optical axis. The ferrule 19 and the third holding member 20 are fixed by soldering under the optimum coupling state, and the holding member 20 is welded and fixed to the holding member 24 by laser beam, for example, for assembly. In this case, since the second lens 10 is in advance assembled integrally with the optical isolator 9, a fixing procedure involving the position adjustment of the second lens 10 for the beams passing through the optical isolator becomes unnecessary.

Figure 4:
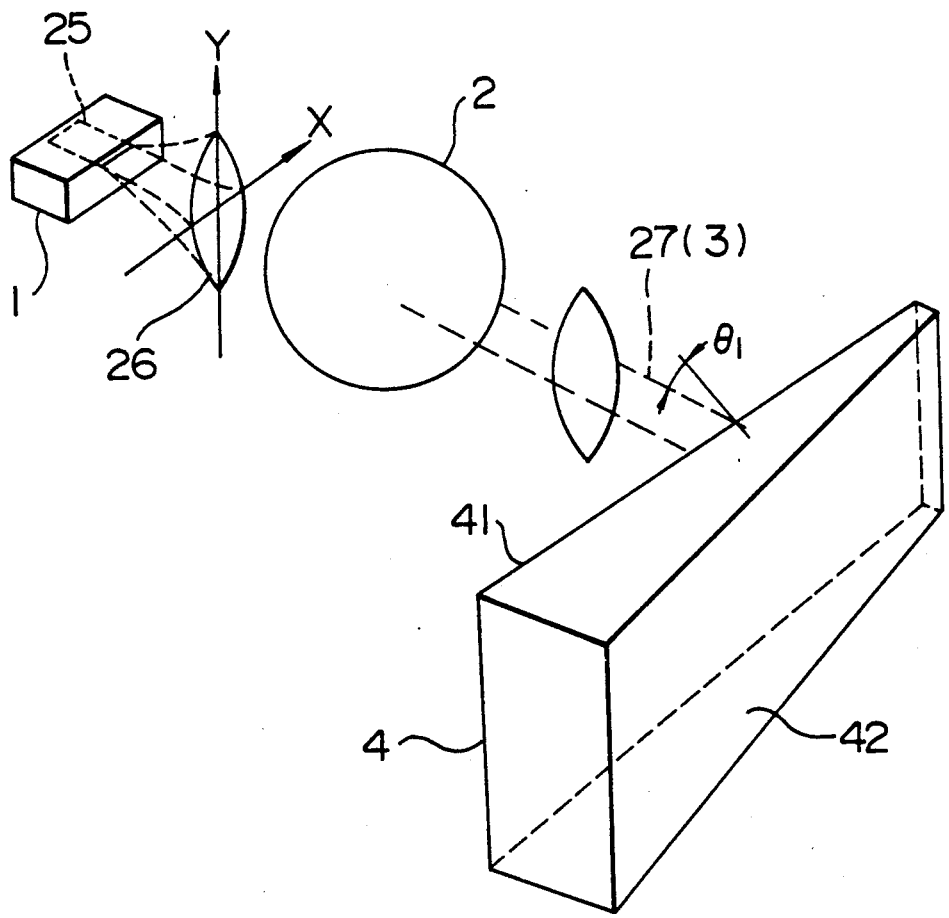

FIG. 4 is an enlarged view when the inclination angle $\theta_1$ of the shielding member having the taper surface 41 is set to the horizontal direction X of the active layer 25 of the semiconductor laser 1.

The far-field pattern 26 of the semiconductor laser beams outgoing from the active layer 25 is an elliptic pattern having its minor axis in the horizontal direction X of the active layer 25 and its major axis in the vertical direction Y as shown in the drawing. This represents that the outgoing angle is smaller in the horizontal direction X than in the vertical direction Y. The effect of preventing reflection can be improved by inclining the inclination angle $\theta_1$ with respect to the X direction towards the direction in which it becomes in parallel with the Y direction as shown in the drawing.

In comparison with a Comparative Example wherein the optical glass sheet having the wedge-shaped section is not provided and wherein a relative noise intensity of the semiconductor laser is from $-90$ to $-110$ dB/Hz, this embodiment provides the relative noise intensity of from $-140$ to $-150$ dB/Hz and can thus reduce near-end reflection noise.

If the second lens is in advance assembled integrally with the optical isolator, position adjustment of the second lens to the optical isolator becomes unnecessary. Accordingly, the man-hours for assembly can be reduced and one fixing portion which otherwise needs positioning can be eliminated, so that fluctuation of the coupling loss resulting from the position error of the position adjustment fixing portion with the passage of time can be reduced.

Though this embodiment represents the case where the first and second lenses use the spherical lens and the condensing type rod lens, respectively, the present invention is not particularly limited thereto but can use those lenses which have similar optical functions. As to low melting glass for coupling and fixing the components, too, glass made of PbO, $B_2O_3$ is a mere example and the present invention is not limited thereto.

We claim:

1. A semiconductor laser module including a semiconductor laser and a built-in optical isolator comprising a polarizer, a Faraday rotator and an analyzer, said optical isolator and said semiconductor laser being located within a hermetic package, wherein said optical isolator further includes a shielding member having a tapered surface disposed on a beam incidence side of said polarizer and said optical isolator is disposed between a first lens for converting outgoing beams of said semiconductor laser to parallel beams and a second lens for condensing the parallel beams passing through said optical isolator, said optical isolator coupling said first lens and said second lens optically to an optical fiber having an end inside said hermetic package.

2. A semiconductor laser module according to claim 1, wherein said second lens is located on a beam outgoing side of said analyzer and said optical isolator is disposed between said first lens and said optical fiber.

3. A semiconductor laser module according to claim 2, wherein said second lens disposed on a beam outgoing side of a holding member for holding said analyzer of said optical isolator, and said analyzer is sealed and fixed hermetically to said holding member.

4. A semiconductor laser module according to claim 2, wherein said shielding member having said tapered surface is inclined with respect to a horizontal direction of an active layer of said semiconductor laser, and said shielding member has another surface disposed in a direction substantially parallel to a vertical direction of said active layer.

5. A semiconductor laser module according to claim 1, wherein said shielding member having said tapered surface is disposed on a beam incidence side of a holding member for holding said polarizer of said optical isolator, and said polarizer is sealed by said holding member and fixed hermetically to said holding member for holding said polarizer.

6. A semiconductor laser module according to claim 1, wherein said polarizer, said analyzer and said Faraday rotator are fixed to holding members for holding said polarizer, said analyzer and said Faraday rotator, respectively, by a low melting glass.

7. A semiconductor laser module according to claim 1, wherein said shielding member having said tapered surface is inclined with respect to a horizontal direction of an active layer of said semiconductor laser, and said shielding member has another surface disposed in a direction substantially parallel to a vertical direction of said active layer.

8. A semiconductor laser module including a built-in optical isolator and a semiconductor laser; said optical system comprising said optical system for coupling optically laser outgoing beams outgoing from said semiconductor laser to an optical fiber; said optical isolator comprising a polarizer, a Faraday rotator and an analyzer; and a hermetic package for storing therein said semiconductor laser and said optical isolator;

said optical system being disposed downstream of said semiconductor laser and including a first lens for converting the laser outgoing beams of said semiconductor laser to parallel beams and guiding the parallel beams to said optical isolator and a second lens disposed downstream of said analyzer of said optical isolator and disposed on an optical axis of said optical isolator, for condensing the parallel beams passing through said optical isolator and coupling the parallel beams optically to said optical fiber;

said optical isolator being disposed between said first and second lenses; and an optical refraction member having a tapered surface for refracting the parallel beams incident to said optical isolator at a predetermined angle and being disposed on a beam incidence surface side of said optical isolator, said optical refraction member preventing a return of reflected beams reflected from said optical isolator to said semiconductor laser.

9. A semiconductor laser module according to claim 8, wherein said optical refraction member includes an optical glass sheet having said tapered surface and having a beam incidence surface for receiving the parallel beams, said beam incidence surface being inclined at a predetermined angle with respect to a plane orthogonal to the parallel beams.

10. A semiconductor laser module according to claim 8, wherein said predetermined angle is within a range of 1° to 10°.

11. A semiconductor laser module according to claim 8, wherein said predetermined angle is within a range of 4° to 5°.

12. A semiconductor laser module with a built-in optical isolator comprising:

a semiconductor laser for emitting laser outgoing beams; an optical isolator including a polarizer, a Faraday rotator and an analyzer;

a first lens disposed between said semiconductor laser and said optical isolator, said first lens converting the laser outgoing beams of said semiconductor laser to parallel beams;

a second lens disposed on an optical axis of said optical isolator and disposed on a beam outgoing side of said analyzer of said optical isolator, for condensing the parallel beams passing through said optical isolator and for coupling the parallel beams optically to an optical fiber;

holding members for holding said optical isolator and said second lens;

a shielding member having a tapered surface, disposed on a beam incidence surface side of said holding member, refracting the parallel beams from said first lens at a predetermined angle and guiding the parallel beams to said optical isolator; and a hermetic package for storing said semiconductor laser, said first lens, said optical isolator and said shielding member.

13. A semiconductor module according to claim 12, wherein a tapered angle of the tapered surface of said shielding member is within a range of 1° to 10°.

14. A semiconductor laser module according to claim 12, wherein said Faraday rotator of said optical isolator includes a Liquid Phase Epitaxy thick film.

15. A semiconductor laser module according to claim 12, wherein said holding members include a first holding member for holding said polarizer, said Faraday rotator and said analyzer of said optical isolator and a second holding member for holding said second lens, said first and second holding members are formed separately from each other.

16. A semiconductor laser module according to claim 12, wherein said holding members include a first holding member for holding said polarizer, said Faraday rotator and said analyzer of said optical isolator and a second holding member for holding said second lens, said first and second holding members being formed integrally with each other.

17. A semiconductor laser module according to claim 12, wherein said shielding member is sealed and fixed hermetically on the beam incidence surface side of said holding members.

18. A semiconductor laser module with a built-in optical isolator according to claim 12, wherein said second lens is sealed and fixed hermetically on the beam outgoing side of said holding members.

19. A semiconductor laser module according to claim 12, wherein said polarizer, said Faraday rotator and said analyzer of said optical isolator are fixed to said holding members, respectively, by low melting glass.

20. A semiconductor laser module according to claim 12, wherein said shielding member includes a first surface inclined with respect to a horizontal direction of an active layer of said semiconductor laser and a second surface parallel with a vertical direction of said active layer.

21. A semiconductor laser module according to claim 12, wherein said shielding member includes a glass sheet having a thickness decreasing progressively from one of the ends of the glass sheet to the other of the ends of the glass sheet and a beam incidence surface of the glass sheet is inclined with respect to a surface opposed to said beam incidence surface.

22. A semiconductor laser module according to claim 12, wherein a tapered angle of the taper surface of said shielding member is within a range of 4° to 5°.

* * * * *